(12) United States Patent
Wang et al.

(10) Patent No.: US 6,947,224 B2
(45) Date of Patent: Sep. 20, 2005

(54) METHODS TO MAKE DIFFRACTIVE OPTICAL ELEMENTS

(75) Inventors: Tak Kui Wang, Saratoga, CA (US); James Albert Matthews, Milpitas, CA (US); Ronnie Paul Varghese, Westminster, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/666,444

(22) Filed: Sep. 19, 2003

(65) Prior Publication Data

US 2005/0063071 A1 Mar. 24, 2005

(51) Int. Cl.$^7$ .............................. B29D 11/00; B02B 3/08
(52) U.S. Cl. ...................... 359/742; 359/741; 216/24; 216/26
(58) Field of Search .................... 359/742, 741, 359/743; 216/24, 26, 72, 2, 41, 47

(56) References Cited

U.S. PATENT DOCUMENTS 6,187,211 B1 * 2/2001 Smith et al. ................. 216/26
6,599,666 B2 * 7/2003 Rolfson ........................ 430/5

OTHER PUBLICATIONS

Chien Chieh Lee et al., "Silicon–Based Transmissive Diffractive Optical Element", Optics Letters, vol. 28, No. 14, Jul. 15, 2003, Optical Society of America, pp. 1260–1262.

U.S. Appl. No. 10/210,598, filed Jul. 31, 2002, entitled "Optical Fiber Coupler Having A Relaxed Alignment Tolerance," inventor Christopher L. Coleman, 17 pages.

* cited by examiner

*Primary Examiner*—Timothy Thompson

(57) ABSTRACT

A method for forming a diffractive lens includes forming an etch stop layer on a first surface of a silicon substrate, forming a diffractive optical element above the etch stop layer, forming a planarization layer covering the diffractive optical element, planarizing the planarization layer, forming a bonding layer on the planarization layer, bonding a transparent substrate on the bonding layer, and etching a second surface of the silicon substrate to the etch stop layer to remove a portion of the silicon substrate opposite the diffractive optical element, wherein the remaining portion of the silicon substrate forms a bonding ring.

61 Claims, 11 Drawing Sheets

METHODS TO MAKE DIFFRACTIVE OPTICAL ELEMENTS

FIELD OF INVENTION

This invention relates to a method for making a diffractive optical element (DOE) using complementary metal oxide semiconductor (CMOS) processes.

DESCRIPTION OF RELATED ART

Modern optical systems often make use of diffractive optical elements (DOEs). For example, a DOE lens can be used to focus a laser light into an optical fiber. DOEs operate by modifying the phase of light interacting with the element either in transmission or by reflection. DOEs are formed by patterning phase shifting materials into an appropriate lens.

SUMMARY

In one embodiment of the invention, a method for forming a diffractive lens includes forming an etch stop layer on a first surface of a silicon substrate, forming a diffractive optical element above the etch stop layer, forming a planarization layer covering the diffractive optical element, planarizing the planarization layer, forming a bonding layer on the planarization layer, bonding a transparent substrate on the bonding layer, and etching a second surface of the silicon substrate to the etch stop layer to remove a portion of the silicon substrate opposite the diffractive optical element, wherein the remaining portion of the silicon substrate forms a bonding ring.

BRIEF DESCRIPTION OF THE DRAWINGS

Use of the same reference symbols in different figures indicates similar or identical items. The cross-sectional figures are not drawn to scale and are only for illustrative purposes.

DETAILED DESCRIPTION

A diffractive optical element (DOE) can be fabricated by forming multilayer materials of amorphous silicon and silicon dioxide supported on a silicon substrate and successively patterning the multilayer materials to form the DOE. Such a DOE takes advantage of the high refractive index of the silicon, the alternating etch stop layers in the multilayer materials, and the precision masking offered by complementary metal oxide semiconductor (CMOS) fabs. Such a DOE is well suited for long wavelengths where the silicon substrate is transparent. Due to high absorption of the silicon substrate in the near infrared for wavelengths below 1 micron ($\mu$m), such a DOE cannot be applied to shorter wavelengths such as 850 and 990 nanometer (nm) generated by some lasers.

Figure 1:
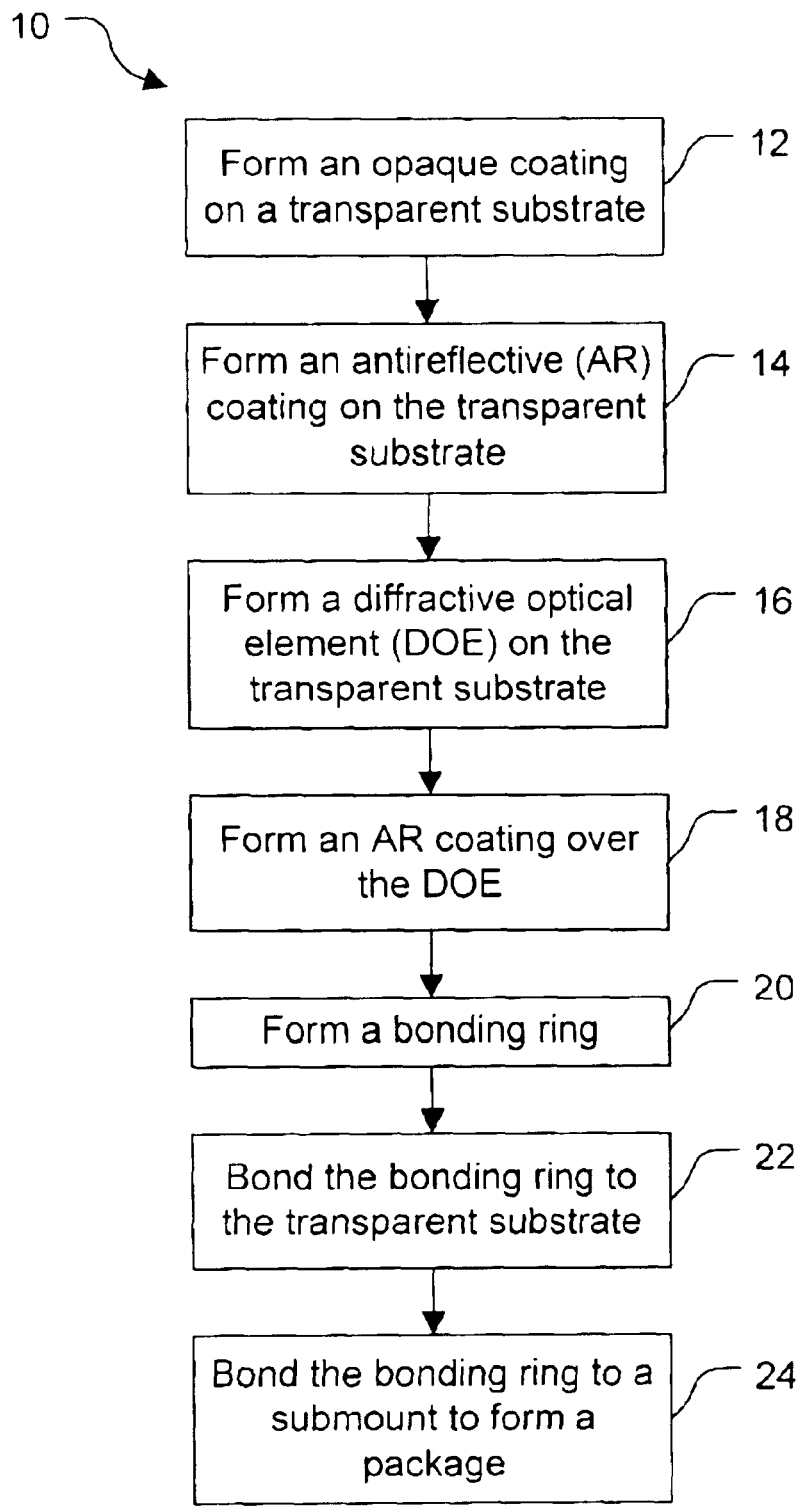
FIG. 1 is a flowchart of a method for making a diffractive optical element (DOE) on a transparent substrate in one embodiment of the invention.

FIG. 1 is a flowchart of a method 10 to form a DOE on a transparent wafer in one embodiment of the invention. Method 10 is hereafter explained in reference to FIGS. 2A to 2E.

Figure 2A:
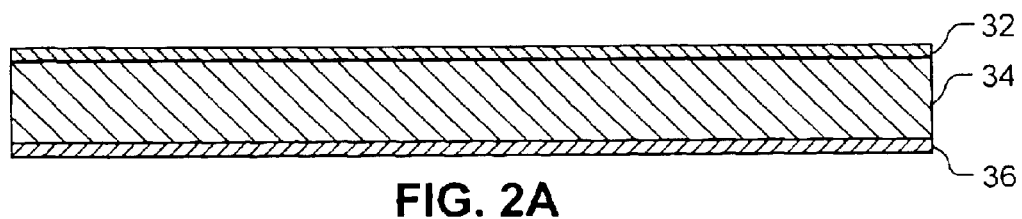
FIGS. 2A, 2B, 2C, 2D, and 2E illustrate the resulting structures formed using the method of FIG. 1 in one embodiment of the invention.

In step 12, as shown in FIG. 2A, an opaque coating 32 is formed on the topside of a transparent substrate 34. Opaque coating 32 is applied to transparent substrate 34 so semiconductor equipment using optical sensors can detect and handle transparent substrate 34. Opaque coating 32 is only shown in FIG. 2A. Transparent substrate 34 is transmissive to a wavelength of interest (e.g., selected from infrared to ultraviolet) if a percentage of the incident light specified by the application is transmitted through the substrate (e.g., at least 10% for most communication applications). Transparent substrate 34 can be quartz, sodium borosilicate glass (e.g., Pyrex®), sapphire, or fuse silica. Opaque coating 32 can be amorphous silicon ($\alpha$-Si) deposited by low pressure chemical vapor deposition (LPCVD) or plasma enhanced chemical vapor deposition (PECVD). Amorphous silicon coating 32 is typically more than 0.5 $\mu$m thick.

In step 14, as shown in FIG. 2A, an antireflective (AR) coating 36 is optionally formed on the backside of transparent substrate 34. AR coating 36 reduces reflection as light travels between a DOE 50 (FIG. 2B) and transparent substrate 34.

Those skilled in the art understand the choice of the AR coating material depends on the refractive index of the incoming medium, the exit medium, and the AR coating material. The ideal AR coating material has a refractive index that is the geometric mean of the incoming medium and the exit medium. The ideal AR coating thickness is equal to a quarter of the wavelength of the light in the AR coating medium. In one embodiment, AR coating 36 is sandwiched between Pyrex® and silicon. Hence, the ideal refractive index is calculated as follows: sqrt (1.5*3.5)=2.29, where 1.5 and 3.5 are the refractive indices of Pyrex® and silicon respectively. Thus, titanium dioxide ($TiO_2$) is selected as the AR material because it has a reflective index of 2.2 that is close to the ideal value of 2.29. The thickness of the $TiO_2$ AR coating 36 for 990 nm operation is then calculated as follows: 990 nm/4/2.2=112.5 nm. Those skilled in the art understand that the refractive index and the thickness of AR coating 36 can be adjusted accordingly. $TiO_2$ AR coating 36 can be deposited by electron beam (e-beam) evaporation.

Figure 2B:
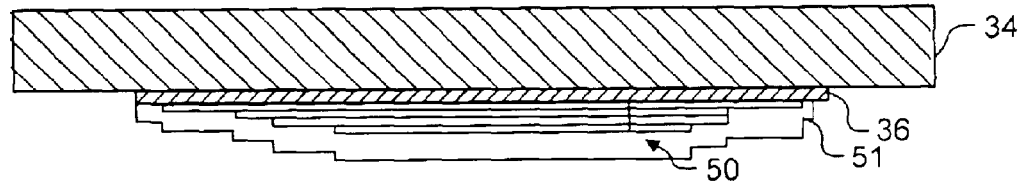

In step 16, as shown in FIG. 2B, a DOE 50 is formed on AR coating 36. DOE 50 includes a stack of phase shifting layers patterned to form the desired diffractive lens. Adjacent phase shifting layers in the stack are separated by an etch stop layer. The phase shifting layers can be amorphous silicon ($\alpha$-Si) and the etch stop layers can be silicon dioxide ($SiO_2$). Alternatively, the phase shifting layers can be silicon nitride ($Si_3N_4$) instead of amorphous silicon.

The DOE layers can be grown by PECVD. The thicknesses of the amorphous silicon and the oxide layers depend on the wavelength of interest, the number of the layers, and the refractive index of the materials. The total phase shift for light through the DOE stack compared to phase shift going through the air should be an integral multiple of $2\pi$. To take advantage of the high refractive index of silicon, the lower index oxide layer is minimized to about 50 Å. This thickness was experimentally determined to be an effective etch stop layer. Hence, for a typical DOE with 8 interleaving layers of amorphous silicon and oxide layer operating at 990 nm, the total phase shift due to the eight oxide etch stop layers is calculated as follows:

$$(RIox - RIAir)*2\pi*(5 \text{ nm}/990 \text{ nm})*8 =$$
$$(1.45 - 1)*2\pi*(5 \text{ nm}/990 \text{ nm})*8 = 0.1142.$$

RIox and RIAir are the refractive indices of oxide etch stop layer and air, respectively. The values 1.45 and 1 are the refractive indices of the oxide layer and the air, respectively. The total phase shift due to the eight amorphous silicon layer is:

$$(RIsi-RIAir)*2\pi*(t/990 \text{ nm})*8.$$

RIsi is the refractive index of the amorphous silicon layer and t is the thickness of that layer. To achieve the desired phase shift through the DOE stack, each of the amorphous silicon layer thickness is calculated as follows:

$$2\pi - 0.1142 = (RIsi-RIAir)*2 \pi*(t/990 \text{ nm})*8, \text{ or}$$

$$t = (2\pi - 0.1142)*990 \text{ nm}/[(RIsi-RIAir)*2\pi*8]$$

$$t = (2\pi - 0.1142)*990 \text{ nm}/[(3.5-1)*2\pi*8]$$

$$t = 48.6 \text{ nm}.$$

The value 3.5 is the refractive index of the amorphous silicon layer.

Once the stack is formed, the top amorphous silicon layer is masked by photoresist and then etched using the oxide layer to stop the etching. After the silicon is etched, the etch chemistry is changed and the oxide layer is etched using the next silicon layer to stop the etching. Each successive layer is masked and etched to form the desired diffractive lens.

In one embodiment, DOE 50 is a bifocal diffractive lens that converts laser light into a small angle distribution that is spread uniformly throughout a volume. The volume's dimensions are large relative to the size of the input face of an optical fiber so the components can easily align. The bifocal diffractive lens has a surface with ridges that provide two focal lengths f1 and f2. A design process for the bifocal diffractive lens can begin with determining a first phase function that defines a surface contour for a conventional diffractive lens having focal length f1. Any conventional techniques for diffractive lens design can be used. In particular, commercial software such as GLAD from Applied Optics Research, Inc. or DIFFRACT from MM Research, Inc. can analyze the phase functions of diffractive elements. A second phase function is similarly generated, wherein the second phase function is such that if the second phase function were multiplexed together with the first phase function, the combination would provide a diffractive lens having the second focal length f2. The second phase function is then scaled so as to provide a partially efficient diffractive lens that focuses a percentage (e.g., 50%) of the incident light but passes the remainder (e.g., 50%) of the incident light unperturbed. The first phase function and the scaled second phase function are multiplexed together to form a final bifocal lens design.

In another embodiment, DOE 50 is a hybrid diffractive/refractive element. The hybrid diffractive/refractive element spreads the light over a volume to expand the alignment tolerance for an optical fiber as described above. The hybrid diffractive/refractive lens has at least one surface with a curvature for one focal length, e.g., f2. Further, diffractive features of a partially efficient diffractive lens are superimposed on one or both surfaces of the hybrid diffractive/refractive lens so that the combination provides two focal lengths f1 and f2 for separate fractions of the incidence light.

In step 18, as shown in FIG. 2B, an AR coating 51 is optionally formed over DOE 50. The refractive index and thickness of AR coating material 51 can be selected as described above. AR coating 51 can be silicon nitride ($Si_3N_4$). Thin film silicon nitride material can have a range of refractive index depending on deposition conditions. Nitride AR coating 51, with a refractive index of 1.9, can be deposited by e-beam evaporation and is typically 130 nm thick for 990 nm wavelength. The use of e-beam evaporation provides a non-conformal coating which is more desirable on the grating surface. AR coating 51 is only illustrated in FIG. 2B.

Figure 2C:
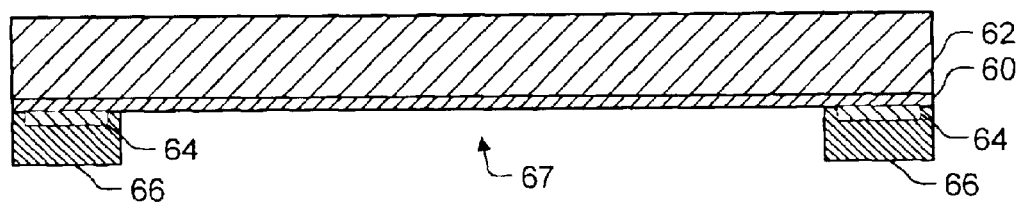
Figure 2D:
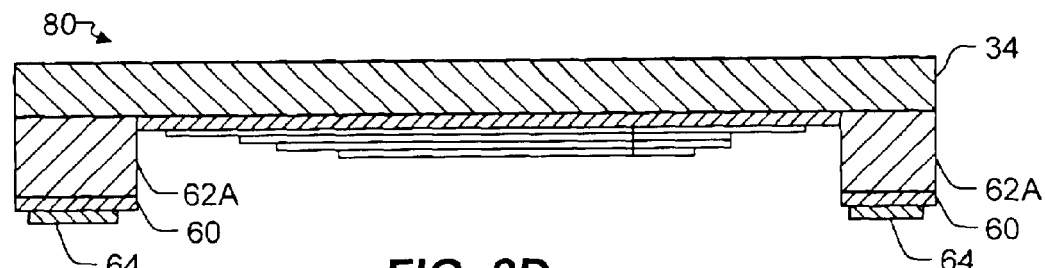

In step 20, as shown in FIGS. 2C and 2D, a silicon substrate 62 is processed to form a bonding ring 62A. A barrier layer 60 is formed on silicon substrate 62. Barrier layer 60 separates any metal from reacting with silicon substrate 62 so that metal silicide will not form in high temperature operations later on. Barrier layer 60 can be silicon nitride ($Si_3N_4$). Nitride barrier layer 60 can be deposited by PECVD and is typically 0.5 $\mu$m thick. Bonding pads 64 are then formed on barrier layer 60. Bonding pads 64 can be formed by patterning a liftoff mask, depositing a metal, and lifting off the mask with the metal. Metal bonding pads 64 can be titanium-platinum-gold (TiPtAu) sequence deposited by e-beam evaporation or sputtering. Titanium has a typical thickness of 50 nm, platinum has a typical thickness of 150 nm, and gold has a typical thickness of 50 nm. A photoresist 66 is then spun, exposed, and developed on barrier layer 60 to form an etch window 67. Portions of barrier layer 60 and silicon substrate 62 exposed by etch window 67 are etched away to form a bonding ring 62A. Barrier layer 60 and silicon substrate 62 can be etched using deep reactive ion etching (DRIE). Photoresist 66 is then stripped away.

In step 22, as shown in FIG. 2D, bonding ring 62A is bonded to transparent substrate 34 to form a lid 80. If transparent substrate 34 is sodium borosilicate glass, bonding ring 62A can be bonded to transparent substrate 34 by an anodic bond. If transparent substrate 34 is quartz or sapphire, an adhesive bond can be used. Alternatively, a hydrofluoric acid (HF) bond can also be used. In HF bonding, two clean surfaces that are pressed together can be joined by dispensing a small amount of HF between the two surfaces. The HF will fill in the gap between the joining pieces by capillary action. When the HF dries up, the two pieces will be joined permanently. Alternatively, a glass frit bond can be used. In glass frit bonding, a fine powder of glass is dispensed between the two joining pieces and heated above the glass reflow temperature during the joining process. This temperature depends on the selected glass frit material and is typically above 250° C.

Figure 2E:
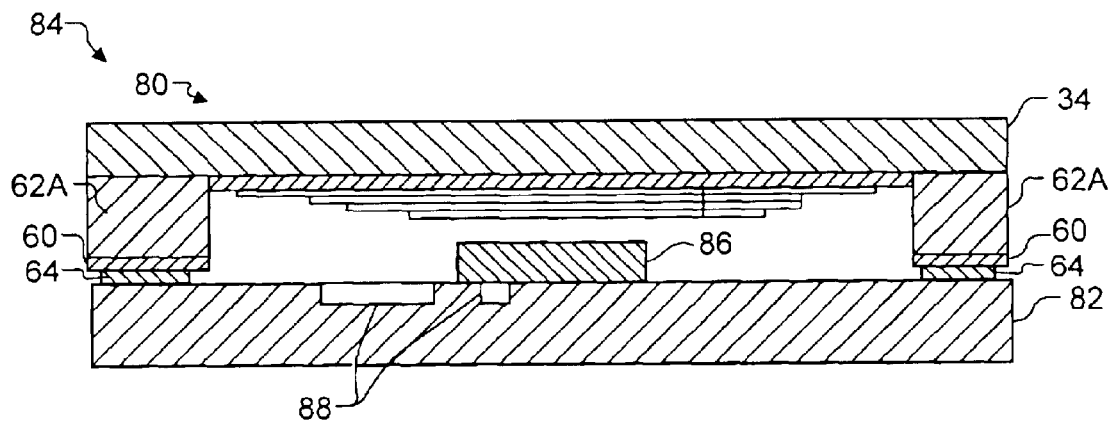

In step 24, as shown in FIG. 2E, lid 80 is bonded to a submount 82 to complete a microelectronic package 84. Lid 80 and submount 82 can be bonded by solder. Submount 82 can include a light source 86 (e.g., a vertical cavity surface emitting laser (VCSEL)). Submount 82 can also include other active and passive circuitry 88.

Figure 3:
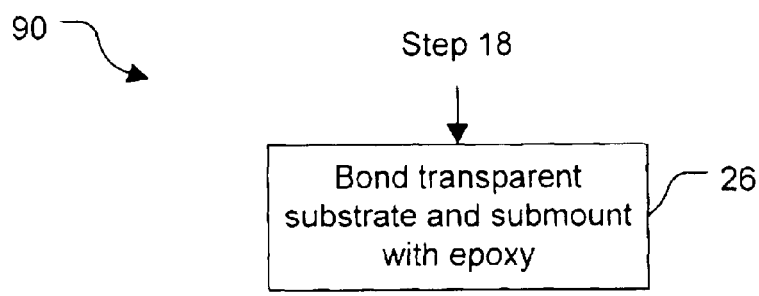
FIG. 3 is a flowchart of a method for making a DOE on a transparent substrate in another embodiment of the invention.

FIG. 3 is a flowchart of a method 90 to form a DOE on a transparent wafer in another embodiment of the invention. Method 90 follows steps 12 to 18 of method 10 in FIG. 1. Step 18 is then followed by step 26 and is hereafter explained in reference to FIG. 4.

Figure 4:
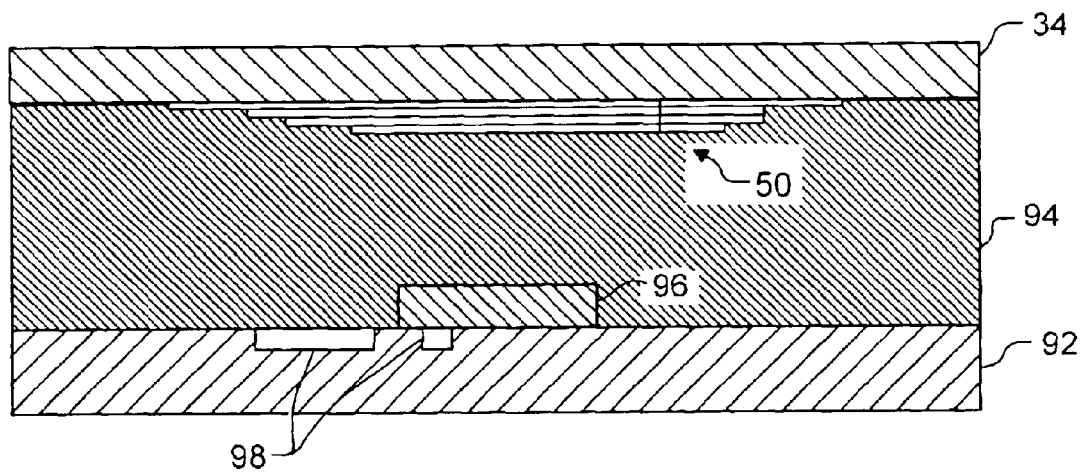
FIG. 4 illustrates the resulting structure formed using the method of FIG. 3 in one embodiment of the invention.

In step 26, as shown in FIG. 4, transparent substrate 34 with DOE 50 is mounted to a submount 92 with a silicone material 94. Submount 92 can include a light source 96 (e.g., a VCSEL). Submount 82 can also include other active and passive circuitry 98.

Figure 5:
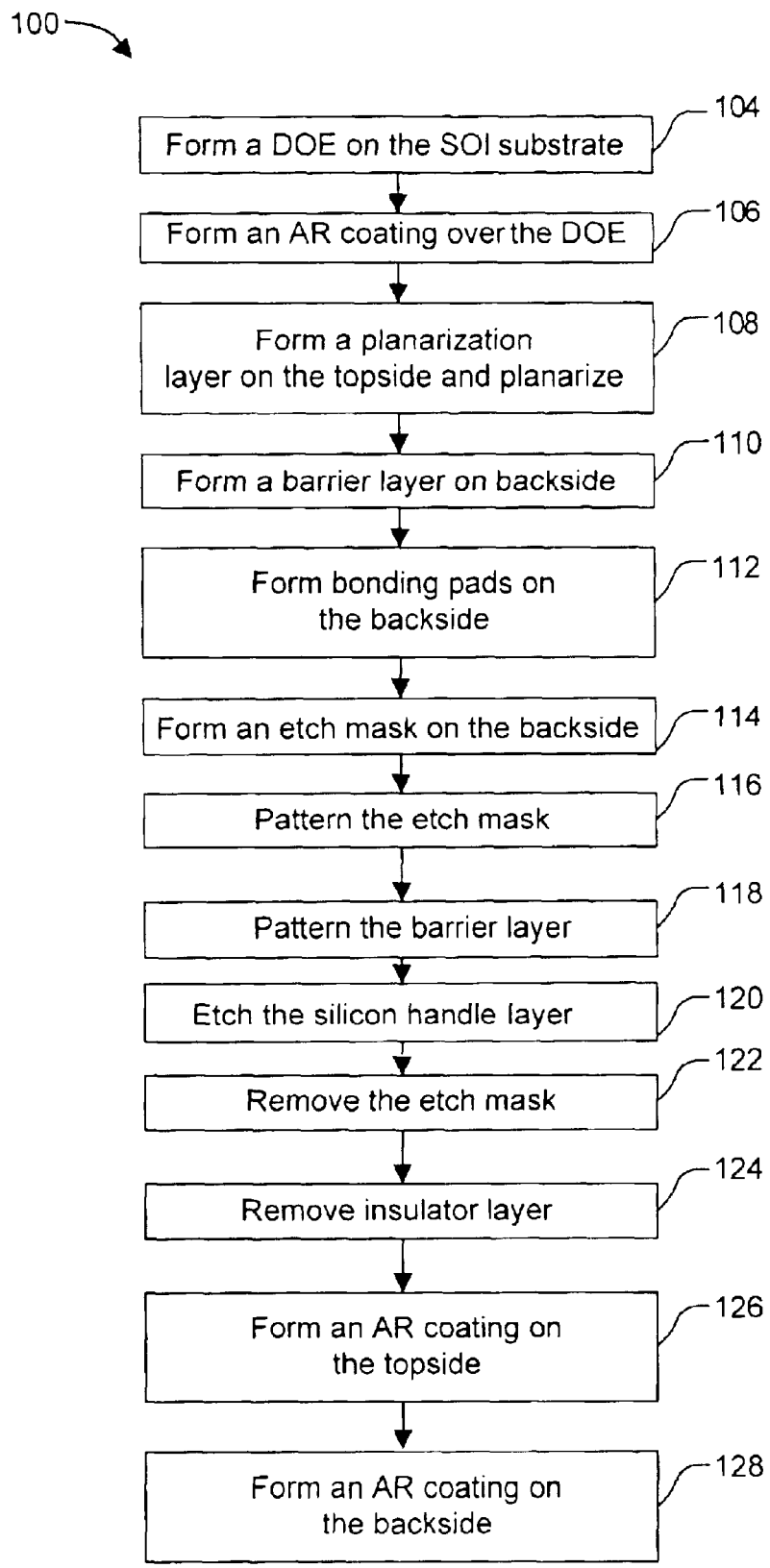
FIG. 5 is a flowchart of a method for making a DOE on a silicon-on-insulator (SOI) substrate in another embodiment of the invention.

FIG. 5 is a flowchart of a method 100 to form a DOE on a silicon-on-insulator (SOI) substrate in another embodiment of the invention. Method 100 is hereafter explained in reference to FIGS. 6A to 6G.

Figure 6A:
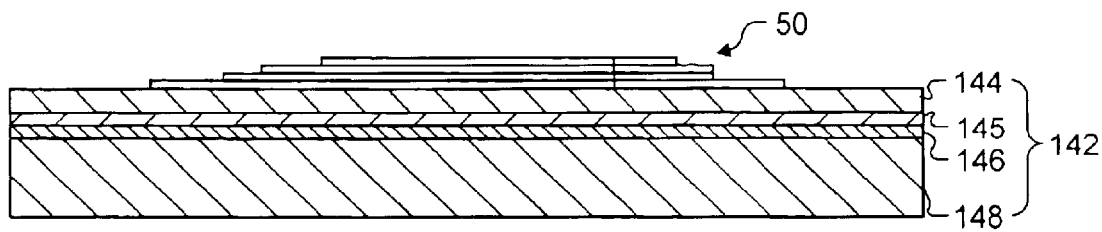
FIGS. 6A, 6B, 6C, 6D, 6E, 6F, and 6G illustrate the resulting structures formed using the method of FIG. 5 in one embodiment of the invention.

In step 104, as shown in FIG. 6A, DOE 50 is formed on an SOI substrate 142. SOI substrate 142 includes a silicon device layer 144, an oxide insulator layer 146, and a silicon handle layer 148. Silicon device layer 144 is typically less than 20 μm thick, which makes it transmissive to wavelengths of 850 and 990 nm. Oxide insulator layer 146 is later used as an etch stop when silicon handle layer 148 is etched to form a bonding ring 148A (FIG. 6E). In one embodiment, SOI substrate 142 further includes a silicon nitride layer 145 (shown only in FIG. 6A) between device layer 144 and oxide insulator layer 146. Such a SOI substrate 142 can be formed by bonding an oxidized wafer with a wafer that is coated with silicon nitride. After the bonding, the wafer with silicon nitride can be grind and lapped thin to form device layer 144. Using such a SOI substrate 142 would eliminate step 128 described later.

DOE 50 is formed as described above in method 10 of FIG. 1 but with the following modification. In method 10, the phase shift is due to different speed of light travelling in DOE 50 and air. In this embodiment, the phase shift is due to different speed of light travelling in DOE 50 and oxide planarization layer 160 (FIG. 6C). Since oxide planarization layer 160 has a refractive index equal or similar to the etch stop oxide in DOE 50, the amorphous silicon thickness is calculated as follows: (990 nm/[(8*(3.5−1.45)])=60.37 nm. The total DOE stack thickness is calculated as follows: [990 nm/(3.5−1.45)+5 nm]*8=523 nm.

Figure 6B:
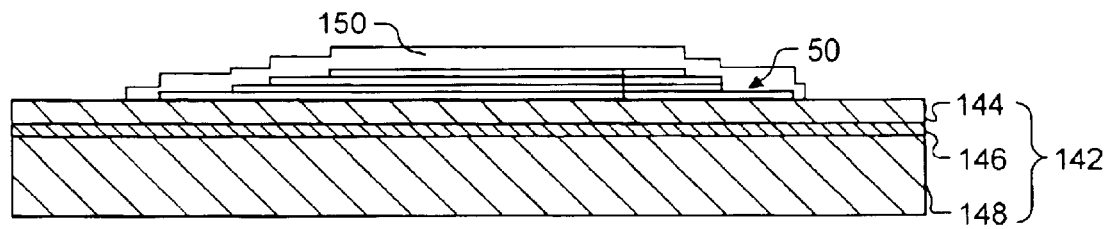
Figure 6C:
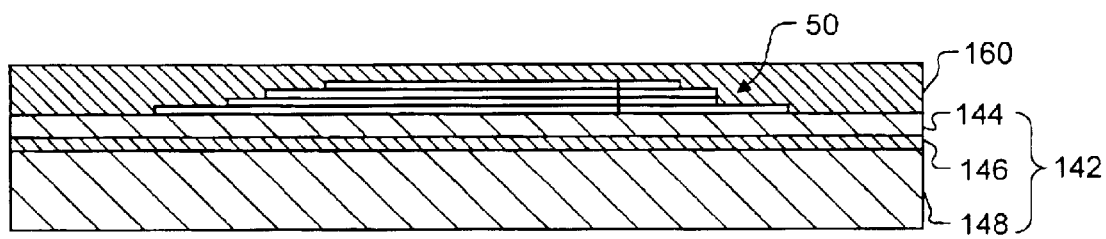

In step 106, as shown in FIG. 6B, an AR coating 150 is optionally formed over DOE 50. The material and the thickness of AR coating 150 are selected as described above. AR coating 150 can be titanium dioxide (TiO$_2$). TiO$_2$ AR coating 150 can be deposited by e-beam evaporation and is typically 112.5 nm thick for 990 nm wavelength. AR coating 150 is only illustrated in FIG. 6B.

In step 108, as shown in FIG. 6C, a planarization layer 160 is formed over device layer 144 and DOE 50, and then planarized if a flat top surface on the resulting structure is desired. Planarization layer 160 can be silicon dioxide (SiO$_2$) formed by PECVD. Oxide planarization layer 160 is typically 0.3 μm thicker than DOE 50 so it can be polished by chemical mechanical polishing (CMP) to a flatness of better than 200 angstroms (Å). In one embodiment for 990 nm wavelength, DOE 50 has a typical thickness of 523 nm. Thus, oxide planarization layer 160 has a typical thickness of 823 nm.

Figure 6D:
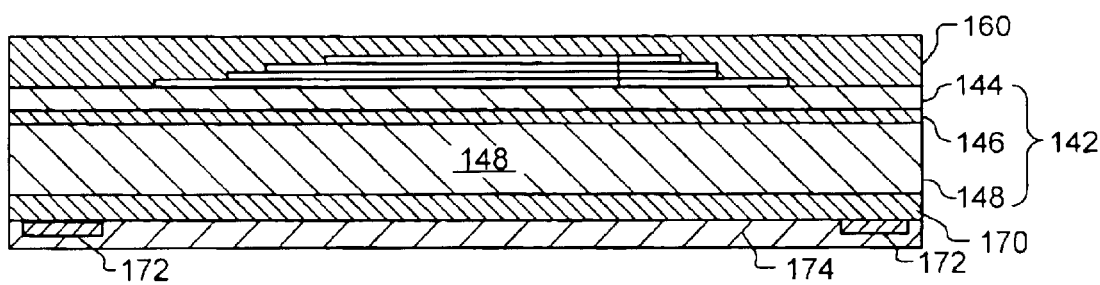
Figure 6E:
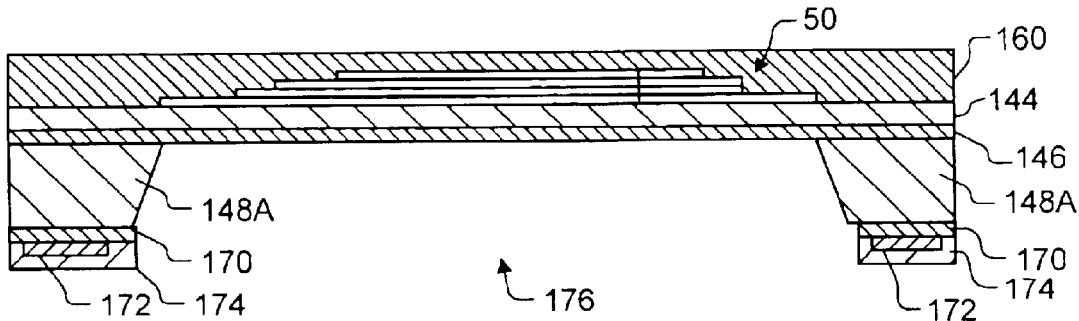

In step 110, as shown in FIG. 6D, a barrier layer 170 is formed on the backside of SOI substrate 142. Barrier layer 170 can be silicon dioxide (SiO$_2$). Oxide barrier layer 170 can be deposited by PECVD and is typically 0.5 μm thick.

In step 112, as shown in FIG. 6D, bonding pads 172 are formed on barrier layer 170. Bonding pads 172 can be titanium-platinum-gold (TiPtAu) sequence deposited by e-beam evaporation or sputtering and patterned by a liftoff mask. Titanium has a typical thickness of 50 nm, platinum has a typical thickness of 150 nm, and gold has a typical thickness of 50 nm.

In step 114, as shown in FIG. 6D, an etch mask layer 174 is formed over barrier layer 170 and bonding pads 172. If a wet etch is to be used, etch mask layer 174 can be silicon nitride (Si$_3$N$_4$) deposited by PECVD. If a dry etch is to be used, etch mask layer 174 can be a photoresist that is spun on.

In step 116, as shown in FIG. 6E, etch mask layer 174 is patterned to form part of an etch window 176. If etch mask layer 174 is nitride, it can be patterned by spinning on a photoresist, exposing the photoresist, developing the photoresist, and etching the nitride. If etch mask layer 174 is a photoresist, it can be patterned by exposing and developing the photoresist.

In step 118, as shown in FIG. 6E, barrier layer 170 is patterned using etch mask layer 174 to form part of etch window 176.

In step 120, as shown in FIG. 6E, a portion of silicon handle layer 148 located opposite of DOE 50 and exposed by etch window 176 is etched down to oxide insulator layer 146, which acts as an etch stop to form a bonding ring 148A. If etch mask layer 174 is nitride, then silicon handle layer 148 can be etched with a potassium hydroxide (KOH) solution. If etch mask layer 174 is a photoresist, then silicon handle layer 148 can be etched using DRIE.

Figure 6F:
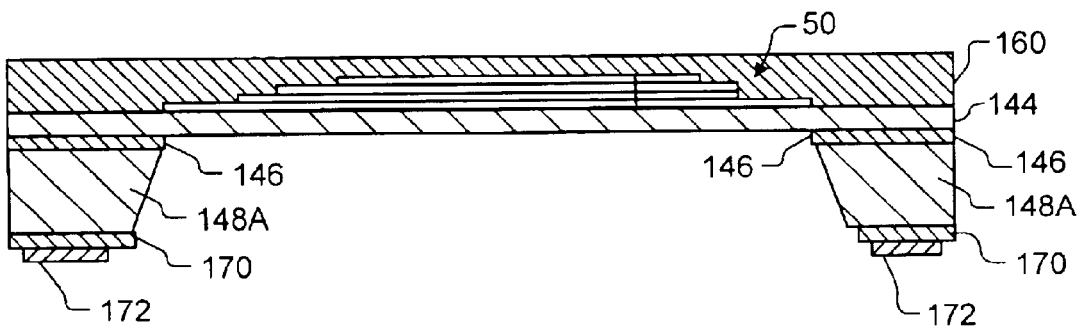

In step 122, as shown in FIGS. 6E and 6F, the remaining etch mask layer 174 is etched away.

In step 124, as shown in FIGS. 6E and 6F, a portion of oxide insulator layer 146 opposite DOE 50 is etched away. Oxide insulator layer 146 can be etched away using hydrofluoric acid (HF).

Figure 6G:
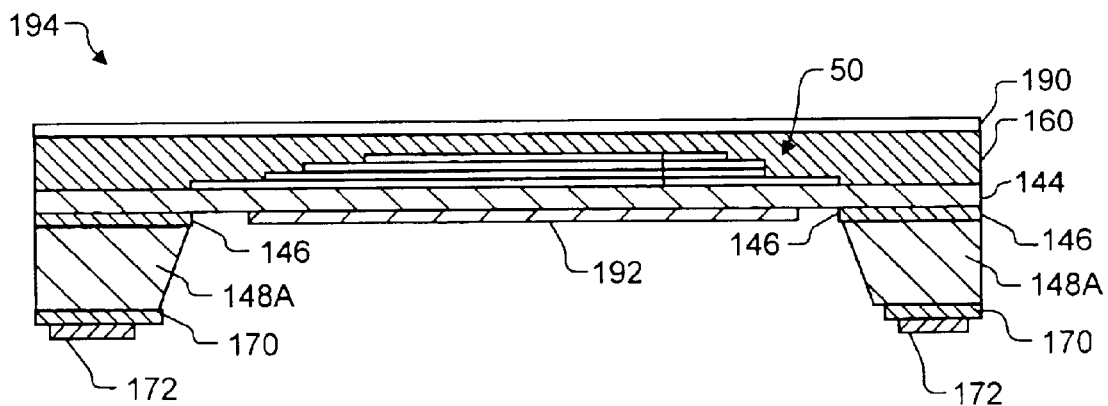

In step 126, as shown in FIG. 6G, an AR coating 190 is optionally formed on planarization layer 160. The material and the thickness of AR coating 190 are selected as described above. AR coating 190 can be magnesium fluoride (MgF$_2$). MgF$_2$ AR coating 190 can be deposited by e-beam evaporation and is typically 179.3 nm thick for 990 nm wavelength.

In step 128, as shown in FIG. 6G, an AR coating 192 is optionally formed on silicon device layer 142 opposite DOE 50. The material and thickness of AR coating 192 are selected as described above. AR coating 192 can be silicon nitride (Si$_3$N$_4$). Nitride AR coating 192 can be deposited by e-beam evaporation through a shadow mask and is typically 132.3 nm for 990 nm wavelength. The shadow mask can be a chem-etched metal foil. The evaporated silicon nitride from the source will pass through the holes in the mask and deposit onto the wafer. This mask is normally mechanically aligned and placed close to the wafer. Note that materials such as silicon nitride and amorphous silicon have a range of refractive indices that can be adjusted by process parameter. Those skilled in the art understand how to adjust refractive index by adjusting parameters such as deposition temperature, gas flow conditions, and pressure. At this point, a lid 194 is formed and can be mounted to a submount to complete a microelectronic package.

Alternatively, step 128 can be bypassed if a SOI substrate 142 including a silicon nitride layer 145 (FIG. 6A) is used. If such a SOI substrate 142 is used, then silicon nitride layer 145 becomes the AR coating for DOE 50.

Figure 7:
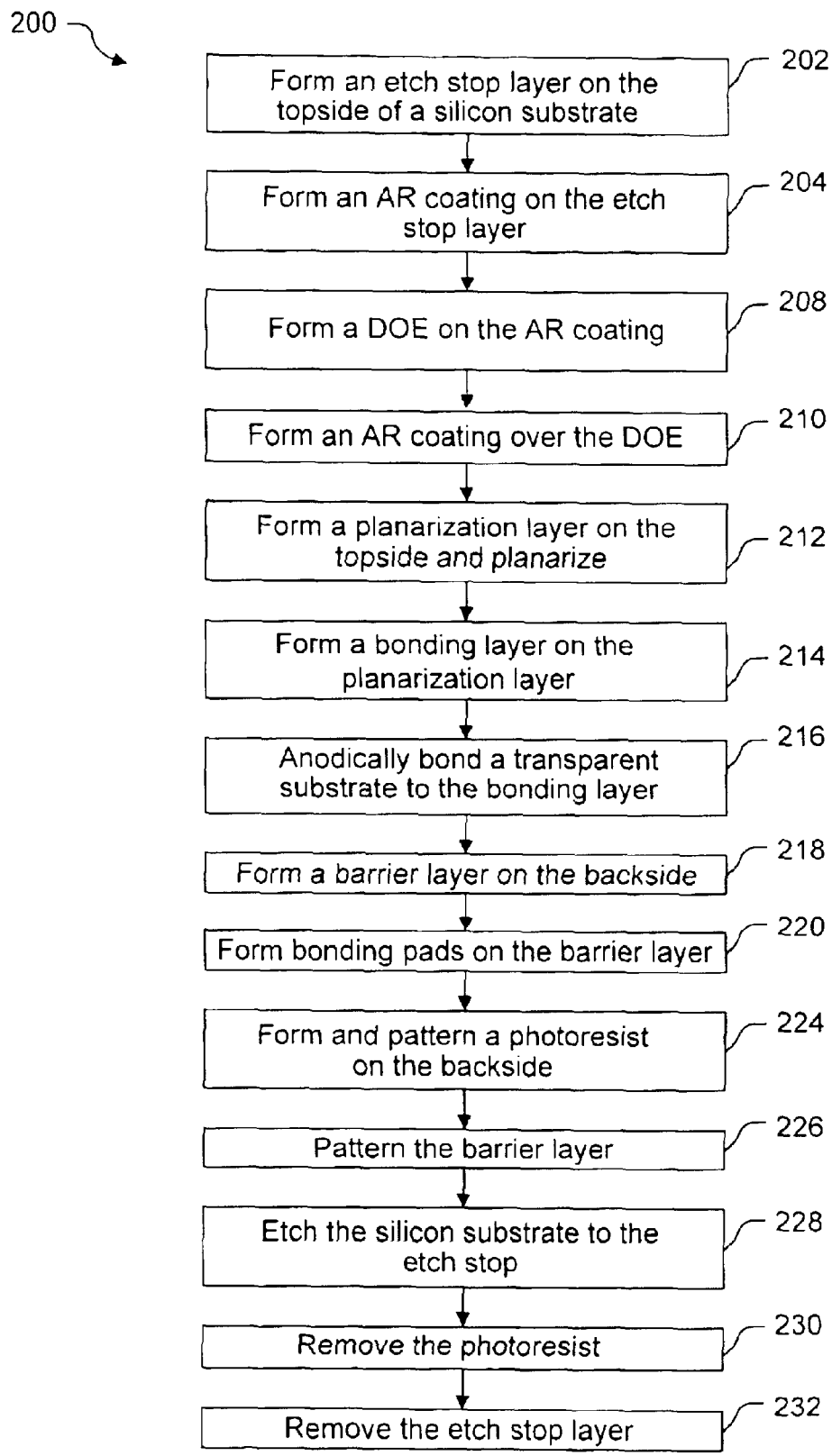
FIG. 7 is a flowchart of a method for making a DOE on a silicon substrate and transferring the DOE to a transparent substrate in another embodiment of the invention.

FIG. 7 is a flowchart of a method 200 to form a DOE on a silicon substrate and transferring the DOE onto a transparent substrate in one embodiment of the invention. Method 200 is hereafter explained in reference to FIGS. 8A to 8G.

Figure 8A:
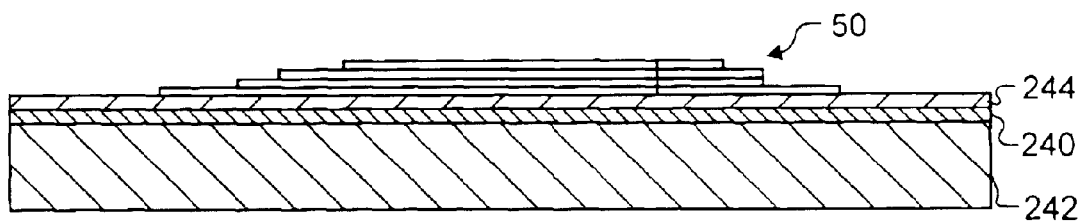
FIGS. 8A, 8B, 8C, 8D, 8E, 8F, and 8G illustrate the resulting structures formed using the method of FIG. 7 in one embodiment of the invention.

In step 202, as shown in FIG. 8A, an etch stop layer 240 is formed on the topside of a silicon substrate 242. Etch stop layer 240 can be silicon dioxide ($SiO_2$). Etch stop layer 240 can be thermally grown or deposited by PECVD and is typically 0.5 μm thick.

In step 204, as shown in FIG. 8A, an AR coating 244 is optionally formed on etch stop layer 240. The material and the thickness of AR coating 244 are selected as described above. AR coating 244 can be silicon nitride ($Si_3N_4$). Nitride AR coating 244 can be deposited by PECVD and is typically 132.3 nm thick for 990 nm wavelength.

In step 208, as shown in FIG. 8A, DOE 50 is formed on AR coating 244. DOE 50 is formed as described above in method 10 of FIG. 1. The thicknesses of DOE layers can be selected as described above.

Figure 8B:
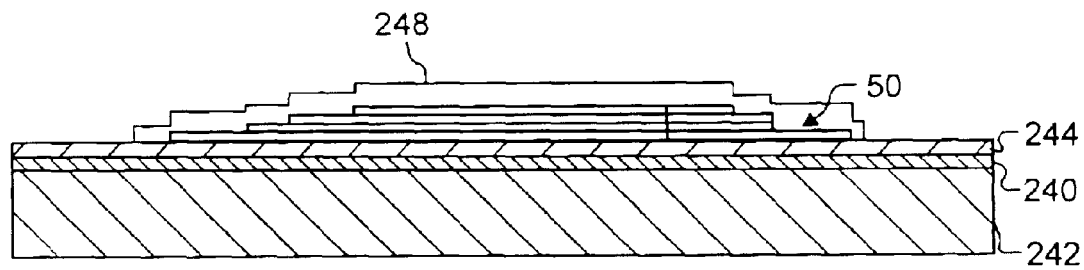

In step 210, as shown in FIG. 8B, an AR coating 248 is optionally formed over DOE 50. The material and the thickness of AR coating 248 are selected as described above. AR coating 248 can be titanium dioxide ($TiO_2$). TiO2 AR coating 248 can be deposited by e-beam evaporation and is typically 112.5 nm thick for 990 nm wavelength. AR coating 248 is only illustrated in FIG. 8B.

Figure 8C:
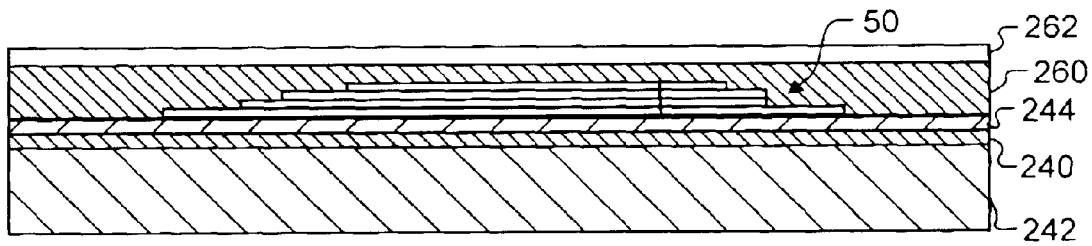

In step 212, as shown in FIG. 8C, a planarization layer 260 is formed over AR coating 244 and DOE 50, and then planarized. Planarization layer 260 can be silicon dioxide ($SiO_2$) formed by PECVD. Oxide planarization layer 260 is typically 0.3 μm thicker than DOE 50 so it can be polished by CMP to a flatness of better than 200 Å. Oxide planarization layer 260 is typically 0.8 μm thick.

Figure 8D:
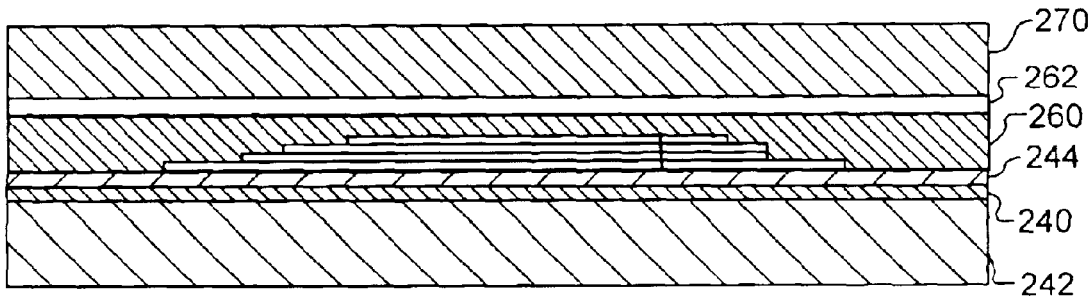

In step 214, as shown in FIG. 8C, a bonding layer 262 is formed on planarization layer 260. Bonding layer 262 can be amorphous silicon (α-Si) deposited by PECVD. Silicon bonding layer 262 has a thickness of half a wavelength of interest, or an integral multiple of half a wavelength of interest. Silicon bonding layer 262 is typically 141.4 nm for 990 nm wavelength. Silicon bonding layer 262 improves anodic bonding of an oxide coated silicon substrate to a sodium borosilicate glass (e.g., Pyrex®) transparent substrate 270 (FIG. 8D). This layer can be omitted for bonding methods other than anodic bonding.

In step 216, as shown in FIG. 8D, transparent substrate 270 is bonded to bonding layer 262. Transparent substrate 270 provides the mechanical support for the remaining structure after silicon substrate 242 is later etched away. Transparent substrate 270 is transmissive to a wavelength of interest (e.g., selected from infrared to ultraviolet) if a percentage of the incident light specified by the application is transmitted through the substrate (e.g., at least 10% for most communication applications). Transparent substrate 270 can be quartz, sodium borosilicate glass (e.g., Pyrex®), sapphire, or fuse silica. The preferred transparent substrate 270 is sodium borosilicate glass that can bonded to bonding layer 262 by an anodic bond. Alternatively, an adhesive bond, a HF bond, or a glass frit bond can be used.

Figure 8E:
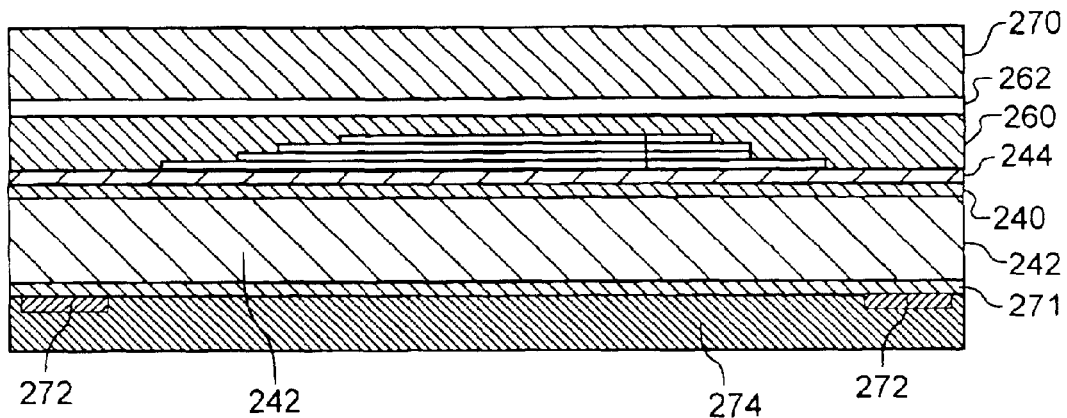

In step 218, as shown in FIG. 8E, a barrier layer 271 is formed on the backside of silicon substrate 242. Barrier layer 271 can be silicon dioxide ($SiO_2$). Oxide barrier layer 271 can be formed by PECVD and is typically 0.5 μm thick.

In step 220, as shown in FIG. 8E, bonding pads 272 are formed on barrier layer 271. Bonding pads 272 can be titanium-platinum-gold (TiPtAu) sequence deposited by e-beam evaporation or sputtering and patterned by a liftoff mask. Titanium has a typical thickness of 50 nm, platinum has a typical thickness of 150 nm, and gold has a typical thickness of 50 nm.

Figure 8F:
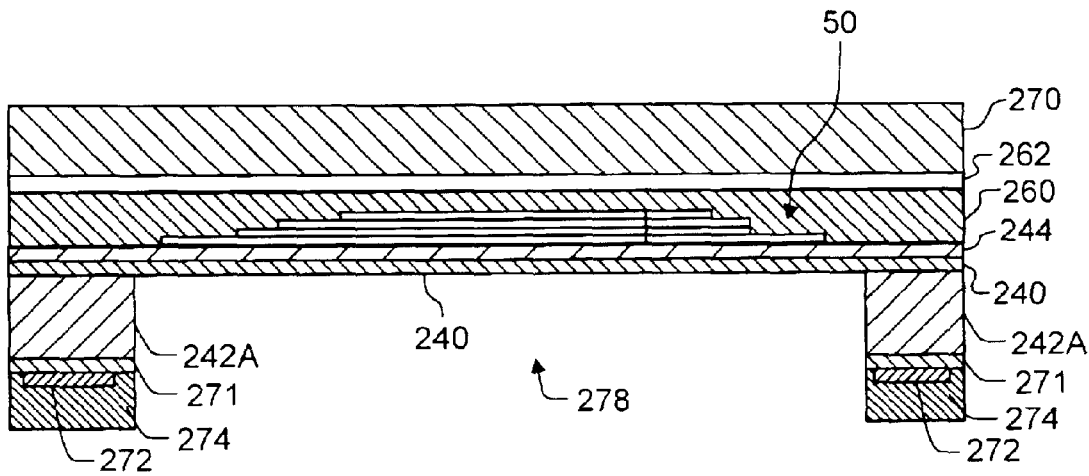

In step 224, as shown in FIGS. 8E and 8F, a photoresist layer 274 is formed and patterned to form part of an etch window 278.

In step 226, as shown in FIGS. 8E and 8F, a portion of barrier layer 271 exposed by etch window 278 is etched using photoresist layer 274 to form part of etch window 278.

In step 228, as shown in FIGS. 8E and 8F, a portion of silicon substrate 242 located opposite of DOE 50 and exposed by etch window 278 is etched down to etch stop layer 240 to form a bonding ring 242A. Silicon substrate 242 can be etched by DRIE.

Figure 8G:
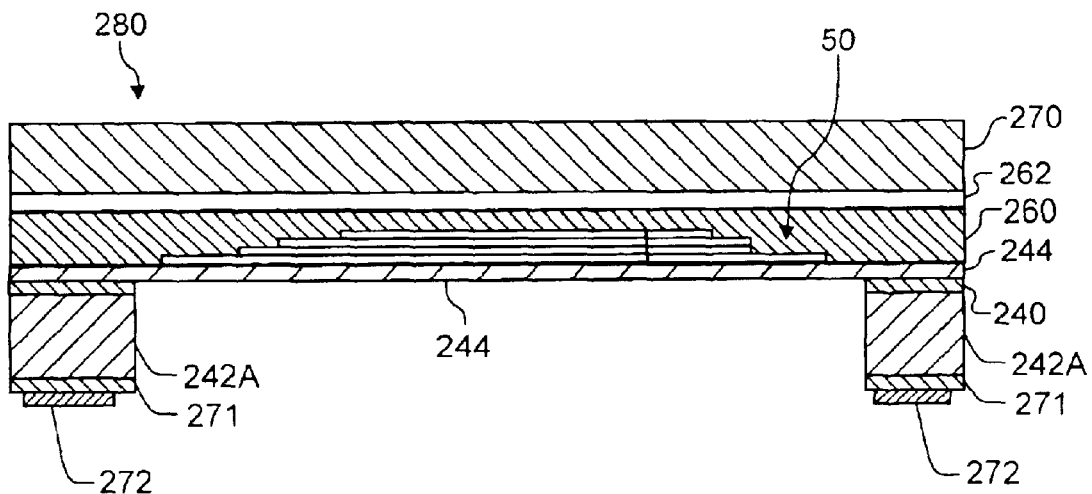

In step 230, as shown in FIGS. 8F and 8G, the remaining photoresist layer 274 is removed chemically by a resist striper.

In step 232, as shown in FIGS. 8F and 8G, a portion of oxide etch stop layer 240 opposite DOE 50 is etched away to expose a portion of AR coating 244. An optional AR coating of magnesium fluoride ($MgF_2$) can be e-beam evaporated onto transparent substrate 270. The thickness and refractive index of the $MgF_2$ can be selected as described above. At this point, a lid 280 is formed and can be mounted to a submount to complete a microelectronic package.

As an alternative to steps 224 to 232, all of silicon substrate 242 can be etched away to form DOE 50 mounted to transparent substrate 270. This results in a lid 280 without bonding ring 242A.

Figure 9:
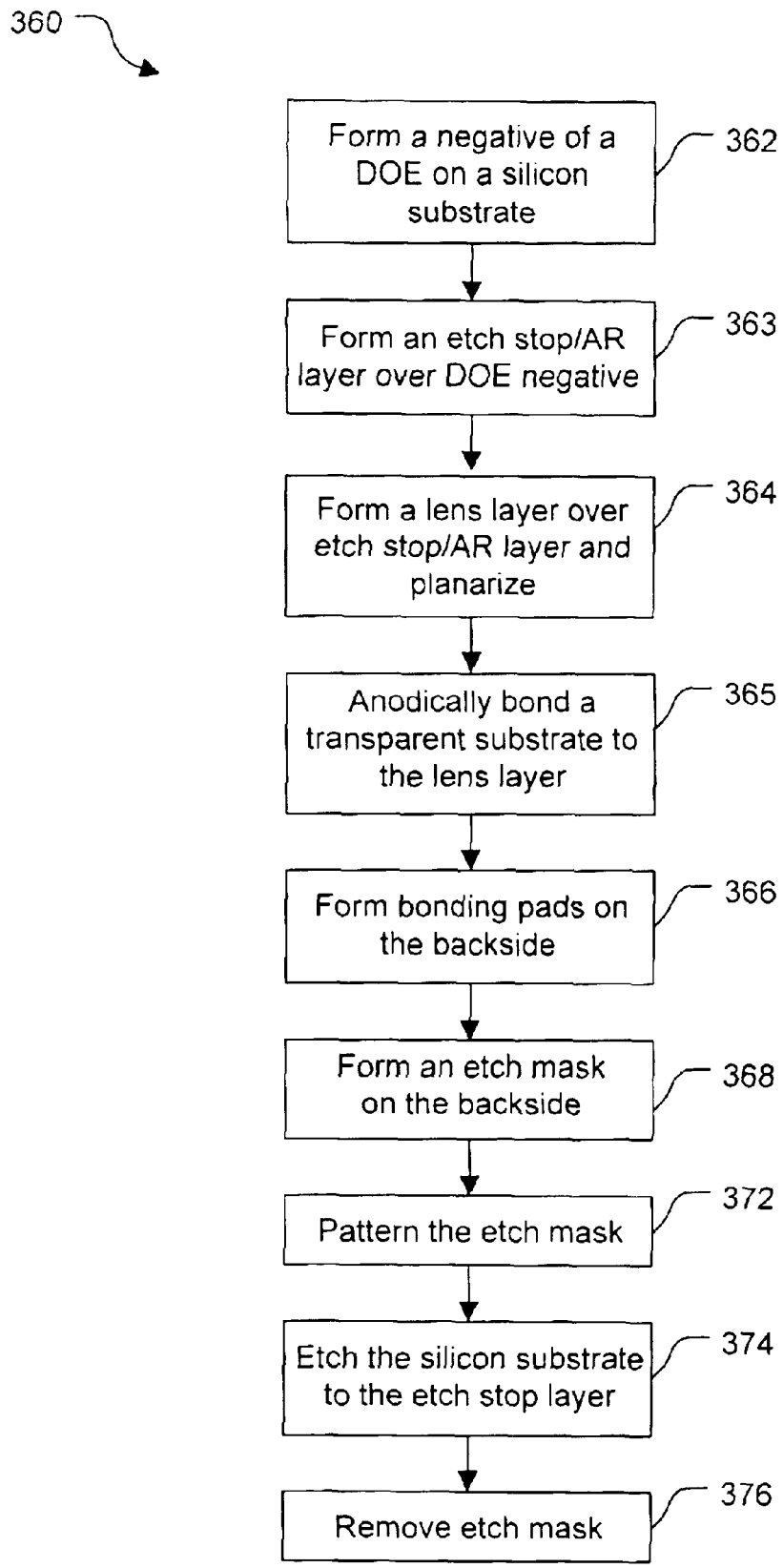
FIG. 9 is a flowchart of a method for making a DOE by transferring a pattern of the DOE from a silicon substrate to a transparent substrate in another embodiment of the invention.

FIG. 9 is a flowchart of a method 360 to form a DOE by transferring a pattern for the DOE from a silicon substrate to a transparent substrate in one embodiment of the invention. Method 360 is hereafter explained in reference to FIGS. 10A to 10D.

Figure 10A:
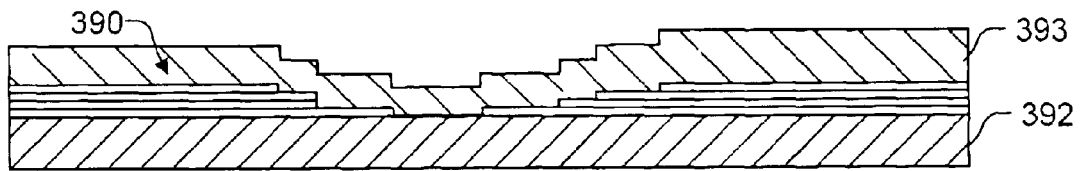
FIGS. 10A, 10B, 10C, and 10D illustrate the resulting structures formed using the method of FIG. 9 in one embodiment of the invention.

In step 362, as shown in FIG. 10A, a mold 390 of a DOE is formed on a silicon substrate 392. Mold 390 can be formed similarly as DOE 50 in method 10 of FIG. 1 except it is an inverted image of the DOE instead of the DOE itself. Since the inverted image will be filled with silicon nitride with refractive index of 2.1, the total thickness of this mold 390 will be 990 nm/(RIsin−Riair)=990 nm/(2.1−1)=900 nm.

Figure 10B:
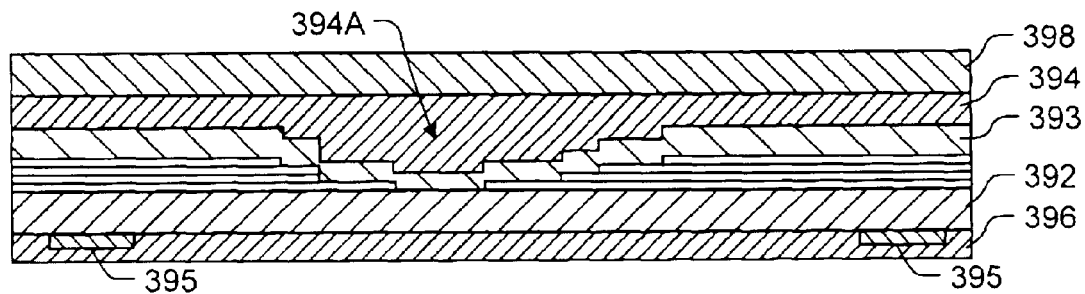

In step 363, as shown in FIG. 10A, a non-conformal silicon dioxide ($SiO_2$) layer 393 is formed over mold 390. Non-conformal oxide layer 393 can be deposited by e-beam evaporation. Oxide layer 393 will serve as an etch stop and an AR coating for a nitride DOE 394A (FIG. 10B). The refractive index of oxide layer 393 is typically 1.45. The thickness of oxide layer 393 is selected as described above (e.g., 990 nm/4/1.45=170.7 nm). As nitride DOE 394A has a refractive index of approximately 2.1, oxide layer 393 with refractive index of 1.45 can be a very effective AR coating material.

In step 364, as shown in FIG. 10B, a lens layer 394 is formed to cover oxide layer 393 and then planarized. As can be seen, a portion of lens layer 394 that conforms to the pattern of oxide layer 393 form a DOE 394A. Lens layer 394 can be silicon nitride ($Si_3N_4$) or silicon dioxide ($SiO_2$) deposited by PECVD and is typically 1200 nm thick. Lens layer 394 can be planarized by CMP to 900 nm thick.

In step 365, as shown in FIG. 10B, a transparent substrate 398 is bonded to etch mask layer 394. Transparent substrate 398 is transmissive to a wavelength of interest (e.g., to a wavelength selected from infrared to ultraviolet) if a percentage of the incident light specified by the application is transmitted through the substrate (e.g., at least 10% for most communication applications). Transparent substrate 34 can be quartz, sodium borosilicate glass (e.g., Pyrex®), sapphire, or fuse silica. If transparent substrate 398 is sodium borosilicate glass, it can be bonded to a nitride lens layer 394 by an anodic bond. Alternatively, a silicon bonding layer can be formed on an oxide lens layer 394 and a sodium borosilicate glass substrate 398 can be bonded to the silicon bonding layer by an anodic bond.

In step 366, as shown in FIG. 10B, bonding pads 395 are formed on the backside of silicon substrate 392. Bonding pads 395 can be titanium-platinum-gold (TiPtAu) sequence deposited by e-beam evaporation or sputtering and patterned by a liftoff mask. Titanium has a typical thickness of 50 nm, platinum has a typical thickness of 150 nm, and gold has a typical thickness of 50 nm.

In step 368, as shown in FIG. 10B, an etch mask layer 396 is formed over the backside of silicon substrate 392 and bonding pads 395. Etch mask layer 396 can be silicon nitride ($Si_3N_4$) deposited by PECVD.

Figure 10C:
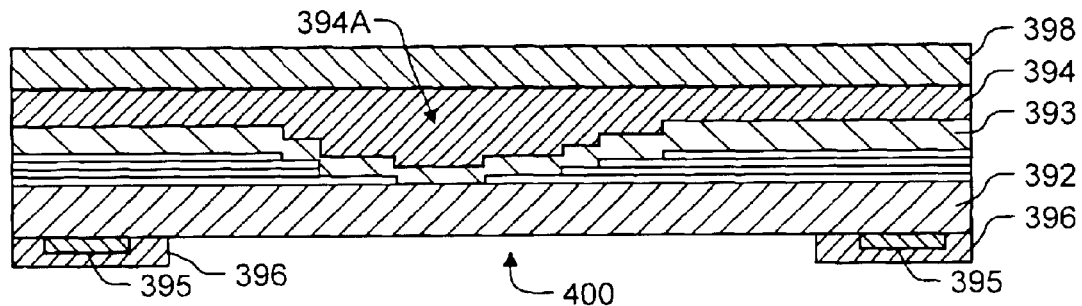

In step 372, as shown in FIGS. 10B and 10C, etch mask layer 396 is patterned to form an etch window 400.

Figure 10D:
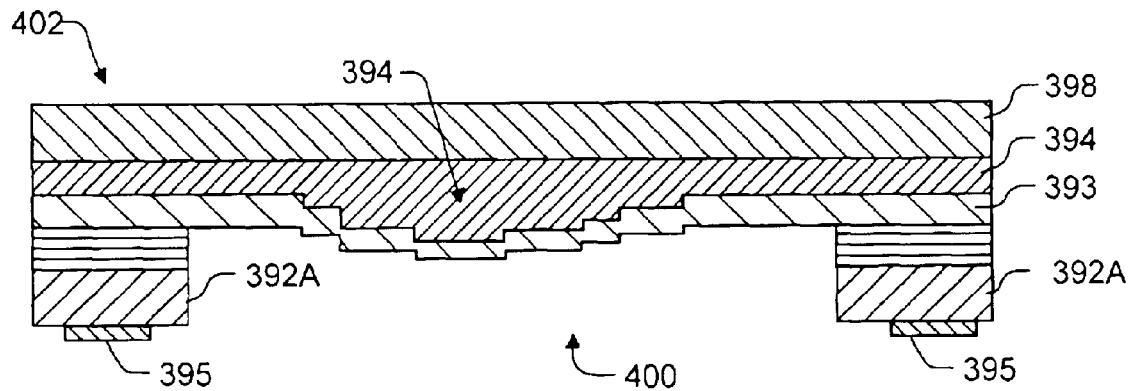

In step 374, as shown in FIGS. 10C and 10D, a portion of silicon substrate 392 located opposite of DOE 394A and exposed by etch window 400 is etched down to oxide layer 393 to form a bonding ring 392A. Silicon substrate 392 can be etched away by DRIE.

In step 376, etch mask layer 396 is etched away. At this point, a lid 402 is formed and can be mounted to a submount to complete a microelectronic package.

Various other adaptations and combinations of features of the embodiments disclosed are within the scope of the invention. Numerous embodiments are encompassed by the following claims.

What is claimed is:

1. A method for forming a diffractive lens, comprising:
   forming a stack comprising above a first surface of a transparent substrate, the stack comprising at least two phase shifting layers separated by an etch stop layer, the transparent substrate being transmissive to a light wavelength selected from infrared to ultraviolet;
   patterning the stack to form layers of a diffractive optical element; and
   bonding a bonding ring to the first surface of the transparent substrate around the diffractive optical element.

2. The method of claim 1, wherein the transparent substrate comprises a material selected from the group consisting of quartz, Pyrex, and sapphire.

3. The method of claim 1, wherein said forming a stack comprises:
   (1) depositing a first phase shifting layer comprising a material selected from the group consisting of amorphous silicon and silicon nitride;
   (2) growing the etch stop layer comprising silicon dioxide on the first phase shifting layer; and
   (3) depositing a second phase shifting layer comprising the material on the etch stop layer.

4. The method of claim 1, further comprising forming an opaque coating on a second surface of the substrate.

5. The method of claim 4, wherein the opaque coating comprises amorphous silicon.

6. The method of claim 1, further comprising, prior to said forming a stack:
   forming an antireflective coating on the first surface of the transparent substrate, wherein the stack is formed on the antireflective coating.

7. The method of claim 1, further comprising, subsequent to said patterning the stack:
   forming an antireflective coating over the diffractive optical element.

8. The method of claim 1, wherein said bonding comprises forming a bond selected from the group consisting of an anodic bond, an adhesive bond, a hydrofluoric acid bond, and a glass frit bond.

9. The method of claim 1, further comprising bonding a submount to the bonding ring to form a package.

10. A method for forming a diffractive lens, comprising:
    forming stack comprising above a first surface of a transparent substrate, the stack comprising at least two phase shifting layers separated by an etch stop layer, the transparent substrate being transmissive to a light wavelength selected from infrared to ultraviolet;
    patterning the stack to form layers of a diffractive optical element; and
    bonding a submount to the first surface of the transparent substrate with silicone.

11. A method for forming a diffractive lens, comprising:
    providing a silicon-on-insulator (SOI) substrate comprising a transparent device layer, an insulator layer below the device layer, and a handle layer below the insulator layer, the transparent device layer being transmissive to a light wavelength selected from infrared to ultraviolet;
    forming a stack above the transparent device layer, the stack comprising at least two phase shifting layers separated by an etch stop layer;
    patterning the stack to form layers of a diffractive optical element; and
    etching the handle layer to the insulator layer to remove a portion of the handle layer opposite the diffractive optical element, wherein the remaining portion of the handle layer forms a bonding ring.

12. The method of claim 11, further comprising:
    etching the insulator layer to remove a portion of the insulator layer opposite the diffractive optical element.

13. The method of claim 12, further comprising:
    forming an antireflective coating on a second surface of the transparent device layer opposite the diffractive optical element.

14. The method of claim 11, further comprising:
    forming a bonding pad on the bonding ring.

15. The method of claim 11, further comprising:
    forming a planarization layer over the diffractive optical element; and
    planarizing the planarization layer.

16. The method of claim 15, further comprising:
    forming an antireflective layer on the planarization layer.

17. A diffractive lens, comprising:
    a transparent substrate being transmissive to a light wavelength selected from infrared to ultraviolet;
    a diffractive optical element above a first surface of the transparent substrate, the diffractive optical element comprising at least two phase shifting layers separated by an etch stop layer; and
    a bonding ring bonded to the first surface of the transparent substrate around the diffractive optical element.

18. The lens of claim 17, wherein the transparent substrate comprises a material selected from the group consisting of quartz, Pyrex, and sapphire.

19. The lens of claim 17, further comprising an opaque coating on a second surface of the substrate.

20. The lens of claim 19, wherein the opaque coating comprises amorphous silicon.

21. The lens of claim 17, further comprising:
    an antireflective coating between the first surface of the transparent substrate and the diffractive optical element.

22. The lens of claim 17, further comprising:
    an antireflective coating over the diffractive optical element.

23. The lens of claim 17, wherein the bonding ring is bonded to the transparent substrate by a bond selected from the group consisting of an anodic bond, an adhesive bond, a hydrofluoric acid bond, and a glass frit bond.

24. The lens of claim 17, further comprising:
a submount bonded to the bonding ring to form a package.

25. A diffractive lens, comprising:
a transparent substrate being transmissive to a light wavelength selected from infrared to ultraviolet;
a diffractive optical element above a first surface of the transparent substrate, the diffractive optical element comprising at least two phase shifting layers separated by an etch stop layer; and
a submount bonded to the first surface of the transparent substrate with silicone.

26. A diffractive lens, comprising:
a silicon-on-insulator (SOI) substrate comprising a transparent device layer, an insulator layer below the device layer, and a handle layer below the insulator layer, the transparent device layer being transmissive to a light wavelength selected from infrared to ultraviolet, the handle layer being etched so the remaining portion of the handle layer forms a bonding ring;
a diffractive optical element above a first surface of the transparent device layer, the diffractive optical element comprising at least two phase shifting layers separated by an etch stop layer.

27. The lens of claim 26, further comprising:
an antireflective coating on a second surface of the transparent device layer opposite the diffractive optical element.

28. The lens of claim 26, further comprising:
a bonding pad on the bonding ring.

29. The lens of claim 26, further comprising:
a planarization layer over the diffractive optical element.

30. The lens of claim 29, further comprising:
an antireflective layer over the planarization layer.

31. A method for forming a diffractive lens, comprising:
forming an etch stop layer on a first surface of a silicon substrate;
forming a diffractive optical element above the etch stop layer;
forming a planarization layer over the diffractive optical element;
planarizing the planarization layer;
bonding a transparent substrate to the planarization layer, the transparent substrate being transmissive to a light wavelength selected from infrared to ultraviolet; and
etching a second surface of the silicon substrate to the etch stop layer to remove at least a portion of the silicon substrate opposite the diffractive optical element.

32. The method of claim 31, wherein the transparent substrate comprises a material selected from the group consisting of quartz, Pyrex, and sapphire.

33. The method of claim 31, wherein said forming a diffractive optical element comprises:
forming a stack comprising at least two phase shifting layers separated by another etch stop layer; and
pattering the stack to form layers of the diffractive optical element.

34. The method of claim 31, wherein said bonding a transparent substrate to the planarization layer comprises:
forming a bonding layer on the planarization layer; and
bonding the transparent substrate on the bonding layer by an anodic bond.

35. The method of claim 31, further comprising, prior to said forming a diffractive optical element:
forming an antireflective layer on the etch stop layer, wherein the diffractive optical element is formed on the antireflective layer.

36. The method of claim 35, further comprising:
etching the etch stop layer to remove a portion of the etch stop layer opposite the diffractive optical element.

37. The method of claim 31, wherein the remaining portion of the silicon substrate forms a bonding ring.

38. The method of claim 37, further comprising:
forming a bonding pad on the bonding ring.

39. The method of claim 37, further comprising:
bonding a submount to the bonding ring to form a package.

40. The method of claim 31, wherein said etching a second surface of the silicon substrate further comprises removing all of the silicon substrate.

41. A diffractive lens, comprising:
a transparent substrate being transmissive to a light wavelength selected from infrared to ultraviolet;
a planarization layer below the transparent substrate;
a diffractive optical element below the planarization layer; and
an etch stop layer below the diffractive optical element.

42. The diffractive lens of claim 41, wherein the transparent substrate comprises a material selected from the group consisting of quartz, Pyrex, and sapphire.

43. The diffractive lens of claim 41, wherein the diffractive optical element comprises at least two phase shifting layers separated by another etch stop layer.

44. The diffractive lens of claim 41, further comprising:
a bonding layer between the transparent substrate and the planarization layer.

45. The diffractive lens of claim 41, further comprising:
an antireflective layer between the etch stop layer and the diffractive optical element.

46. The diffractive lens of claim 41, further comprising:
a bonding ring below the etch stop layer.

47. The diffractive lens of claim 46, further comprising:
a bonding pad on the bonding ring.

48. The diffractive lens of claim 46, further comprising:
a submount bonded to the bonding ring from a package.

49. A method for forming a diffractive lens, comprising:
forming a mold for a diffractive optical element on a first surface of a silicon substrate;
forming a lens layer above the mold, wherein the lens layer conforms to the mold to form the diffractive optical element, the lens layer being transmissive to a light wavelength selected from infrared to ultraviolet;
planarizing the lens layer;
bonding a transparent substrate to the lens layer; and
etching a second surface of the silicon substrate opposite of the diffractive optical element, wherein the remaining portion of the silicon substrate forms a bonding ring.

50. The method of claim 49, further comprising, prior to said forming a lens layer above the mold:
forming an etch stop layer on the mold; and
wherein the lens layer is formed on the etch stop layer and said etching a second surface of the silicon substrate comprises etching the silicon substrate to the etch stop layer.

51. The method of claim 49, wherein the lens layer comprises a material selected from the group consisting of silicon nitride and silicon dioxide.

52. The method of claim 49, wherein the transparent substrate comprises a material selected from the group consisting of quartz, Pyrex, and sapphire.

53. The method of claim 49, wherein said forming a mold comprises:
   forming a stack comprising at least two lens layers separated by an etch stop layer; and
   patterning the stack to form layers of the mold for the diffractive optical element.

54. The method of claim 49, further comprising:
   forming a bonding pad on the bonding ring.

55. The method of claim 49, further comprising bonding a submount to the bonding ring to form a package.

56. A diffractive lens, comprising:
   a transparent substrate being transmissive to a light wavelength selected from infrared to ultraviolet;
   a diffractive optical element below the transparent substrate; and
   a bonding ring below the diffractive optical element.

57. The diffractive lens of claim 56, further comprising:
   an etch stop layer between the diffractive optical element and the bond ring.

58. The diffractive lens of claim 56, wherein the diffractive optical element comprises a material selected from the group consisting of silicon nitride and silicon dioxide.

59. The diffractive lens of claim 56, wherein the transparent substrate comprises a material selected from the group consisting of quartz, Pyrex, and sapphire.

60. The diffractive lens of claim 56, further comprising:
   a bonding pad on the bonding ring.

61. The diffractive lens of claim 56, further comprising:
   a submount bonded to the bonding ring from a package.

* * * * *